United States Patent Office 3,070,572
Patented Dec. 25, 1962

3,070,572
PHENOL-MELAMINE-FORMALDEHYDE RESIN
AND PROCESS OF PREPARING SAME
Frank Oland, Muskego, and Robert R. Maccani, Milwaukee, Wis., assignors to Allen-Bradley Company, Milwaukee, Wis., a corporation of Wisconsin
No Drawing. Filed Mar. 8, 1960, Ser. No. 13,455
6 Claims. (Cl. 260—45.1)

The present invention relates to resinous compositions comprising phenol, melamine and formaldehyde, and particularly relates to a resin formulated from these materials which can be ground to a fine powder and can be cured at a later, independent stage without the use of a hardener. The present invention further relates to the production of such resinous compositions and articles formed of the same.

The preparation of one-stage, phenol formaldehyde resins, as well as one-stage melamine-formaldehyde resins are well known in the industry. The presently known phenol-melamine-formaldehyde resins, however, are generally thermoplastic and require a curing hardener, such as hexamethylenetetramine. In addition, the available phenol-melamine-formaldehyde resins are either of a liquid or a syrupy consistency prior to curing, and cannot be worked by conventional ballmilling and rolling techniques. Traditional melamine resins are also very difficult to transfer mold and it is relatively expensive to produce objects of the same.

It is an object of the present invention to prepare a phenol-melamine-formaldehyde resin which is a solid resin and may be cured in two stages, and does not of necessity require a hardener for curing to an infusible and insoluble state.

It is another object of the present invention to provide a molding compound having improved color characteristics compared to standard phenolic resins and of improved molding and dimensional properties when compared to melamine and existing phenol-melamine-formaldehyde resins.

It is a further object of the present invention to provide a formulation for molding compounds from an improved phenol-melamine-formaldehyde resin which compounds can be made in light colors and have excellent dimensional stability characteristics evidenced by the ability to mold around large inserts without cracking.

The present invention contemplates a definite process for the preparation of a resinous molding composition and it has been found that pH values are of paramount importance and must be maintained within limits with minimum of error to insure reproducibility. In the present case, the molar proportions of an initial reaction of formaldehyde and melamine must be carefully controlled, as should the molar ratio of formaldehyde and phenol entering the reaction at a later stage of the process. Such control is not necessary in the usual single stage, syrupy type resins, but of course the desired properties of a two-stage resin, coloring and dimensional stability are also not achieved. Initially, the melamine is added to formaldehyde and the pH is adjusted to between 6.0 and 6.5, and preferably at 6.3, using a dilute solution of sulphuric acid. This mixture is then heated to about 60° C. over a 10 to 20 minute period, but preferably in a 15 minute period. The temperature is then gradually elevated to approximately 78° C. over a 15 minute period and allowed to remain at that temperature for an additional 15 minutes, for a total time above 60° C. of 30 minutes. This initial step is very important and must be closely watched to prevent an exothermic reaction from taking place and getting out of control.

As previously stated, close attention should also be given to the pH of the initial mixture to insure a maximum of reaction between the melamine and formaldehyde in a linear chain, rather than in a three-dimensional system. Higher pH values favor a cross-linked resin, which would then be difficult to react further with the phenol. In addition, one mol of melamine is capable of condensing with three mols of formaldehyde. In order to prevent this complete condensation, in order that phenol-formaldehyde may be copolymerized therewith the pre-reaction components are preferably controlled at between 1.5:1 to 2.5:1 molar ratio of formaldehyde to melamine.

After the initial melamine-formaldehyde condensation reaction has taken place, the pH is adjusted in the range of between 8.0 and 9.0, and preferably at a value of 8.4–8.5. Freshly distilled phenol and additional formaldehyde are then added, and the pH is again readjusted to the aforementioned range. In this case, the pH control may be provided by using a saturated solution of an alkaline salt, such as sodium carbonate. Here, since the reaction is directed towards the formation of phenol alcohols, an excess of formaldehyde is used, as for instance, between 1.5:1 to 3:1 molar ratio of formaldehyde to phenol. An overall molar ratio of 2:1 to 1:2 phenol to melamine provides desirable limits for acceptable end products. The excess formaldehyde in the second addition further favors cross-linking of the melamine and phenol, in addition to providing an excellent basis for color retention on the addition of the usual dyes.

The reaction mixture is then heated to between 80° C. and 90° C., and preferably at 84–86° C. as quickly as possible and maintained at this temperature for about 30 minutes. The reaction mixture is then heated to reflux, using just enough heat to maintain a gentle refluxing action. The refluxing action is continued for a period of from one to three hours, and preferably for one hour, and then a vacuum dehydration is initiated at between 64° C. and 90° C., at 24″–27″ Hg vacuum. The temperature is critical during the early stages of the phenol reaction due to the high reactivity of phenol. If the exothermic reaction is allowed to take over, the resin will tend to gel during the dehydration. If a higher pH is used, the reaction time must be shortened to compensate for this condition.

The finished resin is hard and brittle and can be ground to a fine powder in addition to being of a neutral, ivory color, providing a basis for dying a wide range of colors running from bright yellow to black. When mixed with alpha cellulose, titanium dioxide and various dyes, any number of light colored compounds will result. Pieces molded from these compounds show no apparent color deterioration even after 100 hours exposure to 100° C. temperatures. Pieces having heavy inserts show no evidence of cracking, attesting to the dimensional stability of the resin.

Various filler materials, as asbestos, silica, wood flour and sisal have all been used with success.

In order that those skilled in the art may understand the inventive concept herein presented, the following specific example is set forth.

*Example*

One mol of melamine and two mols of formaldehyde (as 37% formalin) were charged into a small resin kettle equipped with an agitator, thermometer, reflux condenser and fitted for both steam heating and water cooling. The pH of the initial mixture was adjusted to 6.3 by means of a Beckman pH meter using a 5% solution of sulphuric acid. The mixture was heated to 60° C. using 5–10 p.s.i. of steam, arriving at that temperature over a 15 minute period. The temperature was then gradually elevated to 78° C. over an additional 15 minute period and maintained at this temperature by alternate heating and cooling of the kettle.

After a total time, with the temperature being held above 60° C., of 30 minutes, the agitator was stopped and the pH was adjusted to a value of 8.4, using a saturated solution of sodium carbonate. One mol of phenol (freshly distilled) and 1.5 mols of formaldehyde were added and the pH was readjusted to 8.4. The agitator was started and the mixture immediately became homogeneous. The temperature of this mixture was raised to 85° C. with steam at 5–10 p.s.i., and alternate heating and cooling maintained this temperature between 84° C. and 86° C. for a 30 minute period.

The mixture was then refluxed with the application of 5 p.s.i. of steam and maintained at this gentle reflux rate for an additional hour. After this reflux time was completed, a vacuum of 24″ Hg was applied and the temperature dropped to 64° C. Upon continued heating, the temperature slowly rose to 85° C., at which point the vacuum was raised to 27″ Hg, and continued until the resin reached 88° C. At this time, the resin was poured into a shallow pan and upon cooling, it became hard and brittle.

The hardened resin was then ground in a ball mill and 34 parts of the ground resin were combined with 25 parts alpha cellulose, 5 parts titanium dioxide, 3 parts calcium stearate and a suitable dye, such as "Yellow 3G" or "Orange RR," which are conventional molding dyes supplied by Allied Chemical, National Aniline Division, New York, N.Y. After ballmilling, the ingredients were placed on heated rolls for 5 minutes and then ground into a finished molding compound. The resultant molding powder exhibited an indefinite shelf life and was molded to form at 300° F. in 3 minutes. Pieces molded under these conditions were placed in an oven at 100° C. for 100 hours with no noticeable change in color. The dimensional stability is such that heavy inserts in the molded pieces showed no evidence of cracking of the resin.

While the above example specifically sets forth a preferred mode and utilized melamine, phenol and formaldehyde, it is also to be noted that cresols and xylenols may be substituted in proper molar ratio for the phenol with comparable, though not necessarily as desirable, results, and also that paraformaldehyde may be substituted for formaldehyde to provide resins of similar characteristics. Substitutions of such components have been found which may not be as commercially successful from a final color or dimensional stability standpoint, but do provide a two-stage, solid resin suitable for purposes where such characteristics may be sacrificed. Other filler materials have been utilized and comprise asbestos, silica, wood flour and sisal.

Various molding dyes, pigments and lubricants may be interchanged with those specified in the above example with substantially equal result.

It will be apparent that an improved resin has been provided by the present invention and is one of improved form which may be utilized in regular ballmilling techniques and which may be transfer molded when desired and cured without the necessity of a hardener. It is of interest to note that pieces made under the specific example set forth above exhibited excellent results when subjected to water absorption, steam tests and post cure shrinkage. That is, finished pieces were placed in water at room temperature for 150 hours. After soaking in the water, they were measured and were then placed in a desiccator for a comparable time and measured once again. After 150 hour immersion period the pieces exhibited only 0.59% increase in size, and the soaked samples, after a 150-hour desiccation period, exhibited a change from original size of −0.02%.

For steam testing, samples were exposed to 10 p.s.i. of steam for 100 hours. After a 100-hour exposure, the samples increased in size only 3.53% and decreased in weight 0.65%. A post cure shrinkage test in which samples were subjected to 100° C. temperature for 250 hours and then cooled to room temperature before measuring to eliminate thermal expansion, indicated 0.37% shrinkage, whereas comparative straight melamine resin samples indicated a 1.85% shrinkage under similar test conditions.

As far as strength is concerned, pieces molded with sisal filler exhibited an impact strength of 0.311 foot-pounds, whereas the compound using alpha cellulose as filler has been tested to an impact strength of 0.197 foot-pounds. Alpha cellulose is preferred as a filler for lighter colored articles as it does not show through these compounds as does the sisal filler.

We claim:

1. A process for preparing a two-stage, solid resin capable of being cured without a hardener to an infusible, insoluble, thermosetting, resinous composition, which process comprises the steps of pre-reacting melamine and formaldehyde, wherein the molar ratio of formaldehyde to melamine is within the order of about 1.5:1 to about 2.5:1, and wherein the pre-reaction is maintained at a pH in the range of about 6.0 to 6.5; adding to and reacting with the product of said pre-reaction, phenol and additional formaldehyde, wherein the molar ratio of formaldehyde to phenol is within the order of about 1.5:1 to about 3:1 and wherein the phenol to melamine molar ratio is within the order of about 2:1 to 1:2., maintaining the pH of the reactants in the range of about 8.0 to about 9.0; whereby, upon completion of the reaction, and cooling thereof, a hard brittle resinous molding composition will be formed.

2. A process for preparing a two-stage, solid resin capable of being cured without a hardener to an infusible, insoluble, thermosetting, resinous composition, which process comprises the steps of pre-reacting melamine and formaldehyde, wherein the molar ratio of formaldehyde to melamine is within the order of about 1.5:1 to 2.5:1 and the pre-reaction is maintained at a pH in the range of about 6.0 to 6.5, heating the pre-reactants at an elevated temperature not exceeding 80° C. and for a period of time not exceeding 45 minutes; adding to and reacting with the product of said pre-reaction, phenol and additional formaldehyde, maintaining the pH of the reactants in the range of about 8.0 to about 9.0, and heating the reactants to a temperature within the order of about 80° C. and 90° C. and refluxing the ingredients for a period of between about one hour to about three hours; and cooling the resinous molding composition to a hard, brittle state.

3. A process for preparing a two-stage, solid resin capable of being cured without a hardener to an infusible, insoluble, thermosetting, resinous composition, which process comprises the steps of pre-reacting melamine and formaldehyde, wherein the molar ratio of formaldehyde to melamine is within the order of about 1.5:1 to about 2.5:1 and wherein the pre-reaction is maintained at a pH in the range of about 6.0 to 6.5, and heating the pre-reactants to an elevated temperature not exceeding 80° C. and for a period of time not exceeding 45 minutes; adding to and reacting with the product of said pre-reaction, phenol and additional formaldehyde, wherein the molar ratio of formaldehyde to phenol is within the order of about 1.5:1 to about 3:1 and wherein the phenol to melamine molar ratio is within the order of about 2:1 to 1:2,, maintaining the pH of the reactants in the range of about 8.0 to about 9.0, and heating the reactants to a temperature within the order of about 80° C. and 90° C. and refluxing the ingredients for a period of between about one hour to about three hours; and cooling the resinous molding composition to a hard, brittle state.

4. A process for preparing a two-stage, solid resin capable of being cured without a hardener to an infusible, insoluble, thermosetting, resinous composition, which process comprises the steps of pre-reacting melamine and formaldehyde, wherein the molar ratio of formaldehyde to melamine is within the order of about 1.5:1 to about 2.5:1 and wherein the pre-reaction is maintained at a pH in the range of about 6.0 to 6.5, heating the pre-reactants to an elevated minimum temperature of about 60° C. over a period ranging from about 10 minutes to about 20 minutes and to a maximum temperature of about 80° C. over about a 15 minute period and maintaining the said pre-reaction at said maximum temperature for a period of approximately 15 minutes; adding to the condensation product of said pre-reaction, phenol and additional formaldehyde, wherein the molar ratio of formaldehyde to phenol is within the order of about 1.5:1 to about 3:1 and wherein the phenol to melamine molar ratio is within the order of about 2:1 to 1:2, maintaining the pH of the reactants in the range of about 8.0 to about 9.0, and heating the reactants to a temperature range of within the order of about 80° C. and about 90° C., refluxing the ingredients for a period of between about one hour to about three hours; and cooling the resultant resinous molding composition to a hard, brittle state.

5. A process for preparing a two-stage, infusible, insoluble, thermosetting, resinous composition, which process comprises the steps of pre-reacting melamine and formaldehyde, wherein the molar ratio of formaldehyde to melamine is within the order of about 1.5:1 to about 2.5:1 and wherein the pre-reaction is maintained at a pH in the range of about 6.0 to 6.5; adding to and reacting with the product of said pre-reaction stage, phenol and additional formaldehyde, wherein the molar ratio of formaldehyde to phenol is within the order of about 1.5:1 to about 3:1 and wherein the phenol to melamine molar ratio is within the order of about 2:1 to 1:2; maintaining the pH of the reactants in a range of about 8.0 to about 9.0, and thereby provide, upon completion of said reaction, a resinous hard, brittle, molding composition; comminuting the said molding composition; molding said composition into desired shape; and curing the molded shape at an elevated temperature.

6. A process for preparing a two-stage, infusible, insoluble, thermosetting, resinous composition, which process comprises the steps of pre-reacting melamine and formaldehyde, wherein the molar ratio of formaldehyde to melamine is within the order of about 1.5:1 to about 2.5:1 and wherein the pre-reaction is maintained at a pH in the range of about 6.0 to 6.5, heating the pre-reactants to an elevated temperature not exceeding 80° C. and for a period of time not exceeding 45 minutes; adding to the condensation product of said pre-reaction, phenol and additional formaldehyde, wherein the molar ratio of formaldehyde to phenol is within the order of about 1.5:1 to about 3:1 and wherein the phenol to melamine molar ratio is within the order of about 2:1 to 1:2, maintaining the pH of the reactants in the range of about 8.0 to about 9.0, and heating the reactants to a temperature range of within the order of about 80° C. and about 90° C., refluxing the ingredients for a period of between about one hour to about three hours; cooling the resultant resinous molding composition to a hard, brittle state; comminuting the said molding composition; molding said composition into desired shape; and curing the molded shape at an elevated temperature.

References Cited in the file of this patent

UNITED STATES PATENTS

| | | |
|---|---|---|
| 2,457,738 | Scott | Dec. 28, 1948 |
| 2,500,054 | Anthony et al. | Mar. 7, 1950 |
| 2,826,559 | Updegraff et al. | Mar. 11, 1958 |

FOREIGN PATENTS

| | | |
|---|---|---|
| 562,304 | Great Britain | June 27, 1944 |